US011161473B2

(12) United States Patent
Deng et al.

(10) Patent No.: US 11,161,473 B2
(45) Date of Patent: Nov. 2, 2021

(54) SIDE AIRBAG ASSEMBLY

(71) Applicant: Ford Global Technologies, LLC, Dearborn, MI (US)

(72) Inventors: Zhibing Deng, Northville, MI (US); Joseph Edward Abramczyk, Farmington Hills, MI (US); Deepak Patel, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 101 days.

(21) Appl. No.: 16/748,946

(22) Filed: Jan. 22, 2020

(65) Prior Publication Data
US 2021/0221315 A1    Jul. 22, 2021

(51) Int. Cl.
| | |
|---|---|
| *B60R 21/207* | (2006.01) |
| *B60R 21/231* | (2011.01) |
| *B60R 21/2338* | (2011.01) |
| *B60R 21/233* | (2006.01) |
| *B60N 2/68* | (2006.01) |
| *B60N 2/14* | (2006.01) |
| *B60N 2/58* | (2006.01) |

(52) U.S. Cl.
CPC .............. *B60R 21/207* (2013.01); *B60N 2/14* (2013.01); *B60N 2/58* (2013.01); *B60N 2/68* (2013.01); *B60R 21/233* (2013.01); *B60R 21/2338* (2013.01); *B60R 21/23138* (2013.01); *B60R 2021/23146* (2013.01); *B60R 2021/23308* (2013.01); *B60R 2021/23382* (2013.01)

(58) Field of Classification Search
CPC .... B60R 21/207; B60R 21/23146; B60N 2/68
See application file for complete search history.

(56) References Cited

U.S. PATENT DOCUMENTS

| | | | |
|---|---|---|---|
| 9,862,345 B2 * | 1/2018 | Ohno ..................... | B60R 21/276 |
| 2009/0200775 A1 * | 8/2009 | Sugimoto ............. | B60R 21/207 |
| | | | 280/730.2 |
| 2011/0025034 A1 * | 2/2011 | Lim ....................... | B60R 21/207 |
| | | | 280/743.2 |
| 2012/0013107 A1 | 1/2012 | Shankar | |
| 2015/0367804 A1 * | 12/2015 | Fujiwara ........... | B60R 21/23138 |
| | | | 280/730.2 |
| 2017/0267205 A1 * | 9/2017 | Numazawa ............. | B60N 2/143 |
| 2018/0050651 A1 * | 2/2018 | Fu .......................... | B60R 21/237 |
| 2018/0194317 A1 | 7/2018 | Barbat et al. | |
| 2019/0001916 A1 | 1/2019 | Jo | |
| 2019/0084516 A1 * | 3/2019 | Fu .......................... | B60R 21/207 |
| 2019/0084520 A1 | 3/2019 | Suk | |
| 2019/0135219 A1 * | 5/2019 | Kobayashi .......... | B60R 21/2338 |

* cited by examiner

*Primary Examiner* — James A English
(74) *Attorney, Agent, or Firm* — Frank A. MacKenzie; Bejin Bieneman PLC

(57) ABSTRACT

An assembly includes a seatback frame having a pair of upright frame members. Each of the upright frame members has an inward side and an outward side. The inward sides are spaced from each other and face each other. The outward sides face away from each other. The assembly includes a cross-member extending from one of the upright frame members to the other of the upright frame members. The assembly includes an airbag having a first connection fixed to the outward side and a second connection fixed to the inward side of one of the upright frame members.

17 Claims, 9 Drawing Sheets

SIDE AIRBAG ASSEMBLY

BACKGROUND

A side airbag is mounted to a seatback and is inflatable along a side of an occupant, specifically along the torso and/or hip of the occupant. The side airbag, for example, may be inflatable between the occupant and a vehicle door. The side airbag controls the kinematics of the vehicle occupant in predominantly side impacts.

DETAILED DESCRIPTION

Figure 1:
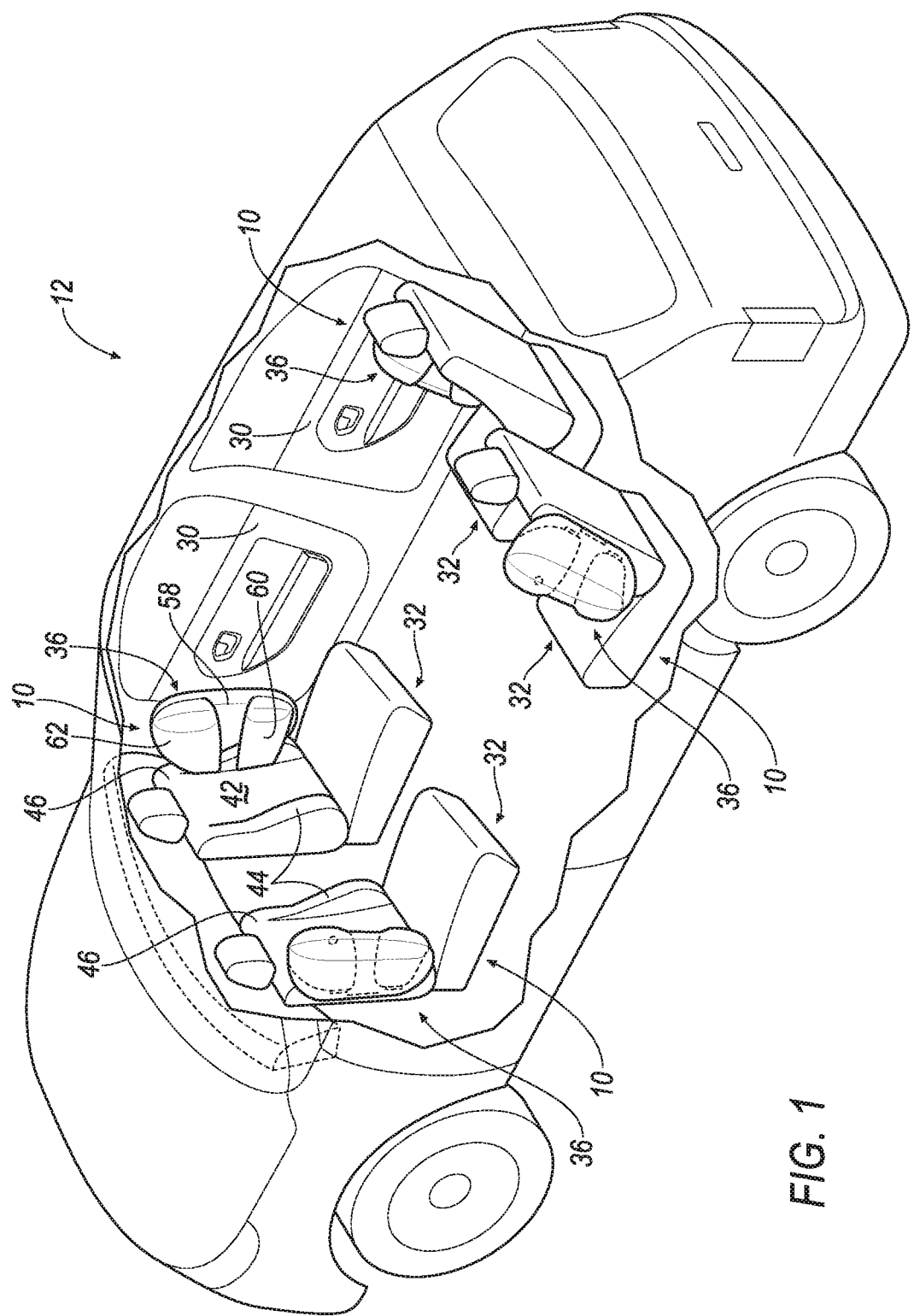
FIG. 1 is a cut-away view of a vehicle having seat assemblies each having an airbag assembly in an inflated position.

An assembly includes a seatback frame having a pair of upright frame members. Each of the upright frame members have an inward side and an outward side. The inward sides are spaced from each other and face each other. The outward side face away from each other. A cross-member extends from one of the upright frame members to the other of the upright frame members. An airbag has a first connection fixed to the outward side and a second connection fixed to the inward side of one of the upright frame members.

The airbag may have a third connection fixed to the inward side of the one of the upright frame members. The airbag may have a first chamber connected to the first connection, a second chamber extending from the first chamber to the second connection, and a third chamber extending from the first chamber to the third connection. The second connection may be a tether extending from the second chamber to the inward side of the one of the upright frame members and the third connection may be another tether extending from the third chamber to the inward side of the one of the upright frame members. The first chamber may be elongated along the one of the upright frame members. The second chamber and the third chamber may be elongated from the first chamber toward the inward side of the one of the upright frame members. The second chamber and the third chamber may be fluidly connected to the first chamber. A baffle may be between the first chamber and the second chamber and another baffle may be between the first chamber and the third chamber. The second chamber and the third chamber may be vertically spaced from each another. The second chamber and the third chamber may be elongated from the first chamber toward the inward side of the one of the upright frame members.

The airbag may have a first chamber connected to the first connection and a second chamber extending from the first chamber to the second connection. The first chamber may be elongated along the one of the upright frame members and the second chamber may be elongated from the first chamber toward the inward side of the one of the upright frame members.

The airbag may be between the covering and the seatback frame.

The cross-member may extend from the inward side of the one of the upright frame members to the inward side of the other upright frame member.

A seat bottom may support the seatback frame. The seat bottom may include a rotatable support rotatable between a vehicle-forward position and a vehicle-rearward position. The upright frame member may be between the airbag and the door when the airbag is inflated and the seat bottom is in the vehicle-rearward position.

A computer has a processor and memory storing instructions executable by the processor to inflate the airbag in response to at least a detection that the seatback frame is in a vehicle-rearward position and detection of a sensed vehicle impact. The upright frame member may be between the airbag and the door when the airbag is inflated and the seatback frame is in the vehicle-rearward position.

A second airbag may be fixed to the other upright frame member. The other upright frame member may include an outward side and an inward side. The second airbag may have a first connection fixed to the outward side of the other upright frame member and a second connection fixed to the inward side of the other upright frame member.

With reference to the Figures, wherein like numerals indicate like parts throughout the several views, an assembly 10 for a vehicle 12 is generally shown. The assembly 10 includes a seatback frame 14 having a pair of upright frame members 16. Each of the upright frame members 16 has an inward side 18 and an outward side 20. The inward sides 18 are spaced from each other and face each other. The outward sides 20 face away from each other. The assembly 10 includes a cross-member 22 extending from one of the upright frame members 16 to the other of the upright frame members 16. The assembly 10 includes an airbag 24 having a first connection 26 fixed to the outward side 20 and a second connection 28 fixed to the inward side 18 of one of the upright frame members 16.

The airbag 24 is inflatable from an uninflated position to an inflated position in response a vehicle impact. The airbag 24 in the inflated position controls the kinematics of an occupant. Since the first connection 26 of the airbag 24 is fixed to the outward side 20 of the frame member and the second connection 28 of the airbag 24 is fixed to the inward side 18 of the frame member, the airbag 24 wraps around at least a portion of the upright frame member 16. Being connected to the inward side 18, the airbag 24 is positioned between the inward side 18 and the occupant to space the occupant from the inward side 18 when the airbag 24 is in the inflated position.

With reference to FIG. 1, the vehicle 12 may, for example, be any suitable type of automobile. The vehicle 12 may, for example, be an autonomous vehicle. In this example, the vehicle 12 may allow for the elimination of a steering wheel. For example, the vehicle 12 shown in FIG. 1 does not include the steering wheel. The vehicle 12 may have a computer 74 programmed to perform operations of the vehicle 12 independently of the intervention of a human driver, completely or to a lesser degree. The computer 74 may be programmed to operate the propulsion, brake system, steering, and/or other vehicle systems based at least in part on data received from sensors. For the purposes of this disclosure, autonomous operation means the computer 74 controls the propulsion device, brake system, and steering system without input from a human driver; semi-autonomous operation means the computer 74 controls one or two of the propulsion system, brake system, and steering system and a human driver controls the remainder; and nonautonomous operation means a human driver controls the propulsion system, brake system, and steering system.

The vehicle 12 includes a body defining a passenger cabin to house occupants, if any, of the vehicle 12. The body may include a roof and a floor with the roof defining an upper boundary of the passenger cabin and the floor defining a lower boundary of the passenger cabin. The body includes doors 30 openable to allow ingress to and egress from the passenger cabin.

The vehicle 12 includes one or more seat assemblies 32. The example shown in FIG. 1 includes four seat assemblies 32, and the vehicle 12 may include any suitable number of seat assemblies 32. The seat assemblies 32 may be arranged in the passenger cabin in any suitable position, i.e., as front seats, rear seats, third-row seats, etc. The seat assemblies 32 may be movable relative to the floor to various positions, e.g., movable fore-and-aft and/or cross-vehicle.

The seat assembly 32 may be rotatable. Specifically, each seat assembly 32 may be rotatable about a vertical axis that extends through the roof and the floor. For example, the seat assemblies 32 may rotate between a vehicle-forward position (FIGS. 2A-2B), a vehicle-rearward position (FIGS. 3A-3B), a vehicle-rightward position, a vehicle-leftward position, and/or positions therebetween. In the vehicle-forward position, an occupant of the seat assembly 32 faces an instrument panel. The seat assemblies 32 may rotate completely, i.e., 360°, about the vertical axis. The seat assemblies 32 may rotate between fixed positions, e.g., the vehicle-forward position and the vehicle-rearward position or may be rotatable to an infinite number of positions. In the example shown in FIG. 1, two front seat assemblies 32 are positioned in the vehicle-rearward position two rear seat assemblies 32 are positioned in the vehicle-forward position.

The seat assembly 32 includes a seat 34 and an airbag assembly 36. One or more of the seat assemblies 32 in the passenger cabin may include at least one airbag assembly 36. In the example shown in the Figures, each of the seat assemblies 32 in the passenger cabin includes two airbag assembly 36. In examples in which the seat assembly 32 includes two airbag assembly 36, the airbag assembly 36 may be mirror images of each other and otherwise identical, as shown in the Figures. In examples including two airbag assembly 36, the airbag assembly 36 and components thereof may be distinguished by identifiers of "first" and "second," e.g., first airbag assembly 36 including first airbag 24, second airbag assembly 36 including second airbag 24, etc. Common numerals are used to identify common features of the seat assemblies 32 and the airbag assembly 36.

The seat 34 may be of any suitable type, e.g., a bucket seat 34 as shown in FIG. 1. The seat 34 includes the seatback 38 and a seat bottom 40. The seatback 38 is supported by the seat bottom 40 and may be stationary or movable relative to the seat bottom 40. The seatback 38 and the seat bottom 40 may be adjustable in multiple degrees of freedom. Specifically, the seatback 38 and the seat bottom 40 may themselves be adjustable, in other words, adjustable components within the seatback 38 and/or the seat bottom 40, and/or may be adjustable relative to each other.

The seatback 38 may define an occupant seating area 42. The occupant may be disposed in the occupant seating area 42. The occupant seating area 42 may be on a front side of the seatback 38. The airbags 24 may extend from the seatback 38 next to the occupant seating area 42 to control occupant kinematics. Specifically, the seatback 38 may have bolsters 44 on opposite sides of the occupant seating area 42 and the airbags 24 may extend from the bolsters 44. The bolsters 44 are elongated, and specifically, are elongated in a generally upright direction when the seatback 38 is in a generally upright position. The bolsters 44 define cross-seat boundaries of the seatback 38, i.e., the seatback 38 terminates at the bolsters 44. The bolsters 44 may extend in a seat-forward direction relative to the occupant seating area 42, i.e., on opposite sides of the torso and shoulders of an occupant seated on the seat assembly 32. The extension of the bolsters 44 relative to the occupant seating area 42 may be defined by the upright frame members 16 and/or the covering 46. In the example shown in the Figures, the size and shape of both the upright frame members 16 and the covering 46 form the bolsters 44 (See FIGS. 2B and 3B).

The seatback 38 may include the seatback frame 14 and a covering 46 supported on the seatback frame 14. The seatback frame 14 may include tubes, beams, etc. Specifically, the seatback frame 14 includes the pair of upright frame members 16 spaced from each other. The upright frame members 16 are elongated, and specifically, are elongated in a generally upright direction when the seatback 38 is in a generally upright position. The cross-member 22 extends between the upright frame members 16. The seatback frame 14 may be of any suitable plastic material, e.g., carbon fiber reinforced plastic (CFRP), glass fiber-reinforced semi-finished thermoplastic composite (organosheet), etc. As another example, some or all components of the seatback frame 14 may be metal, e.g., steel, aluminum, etc.

Figure 2A:
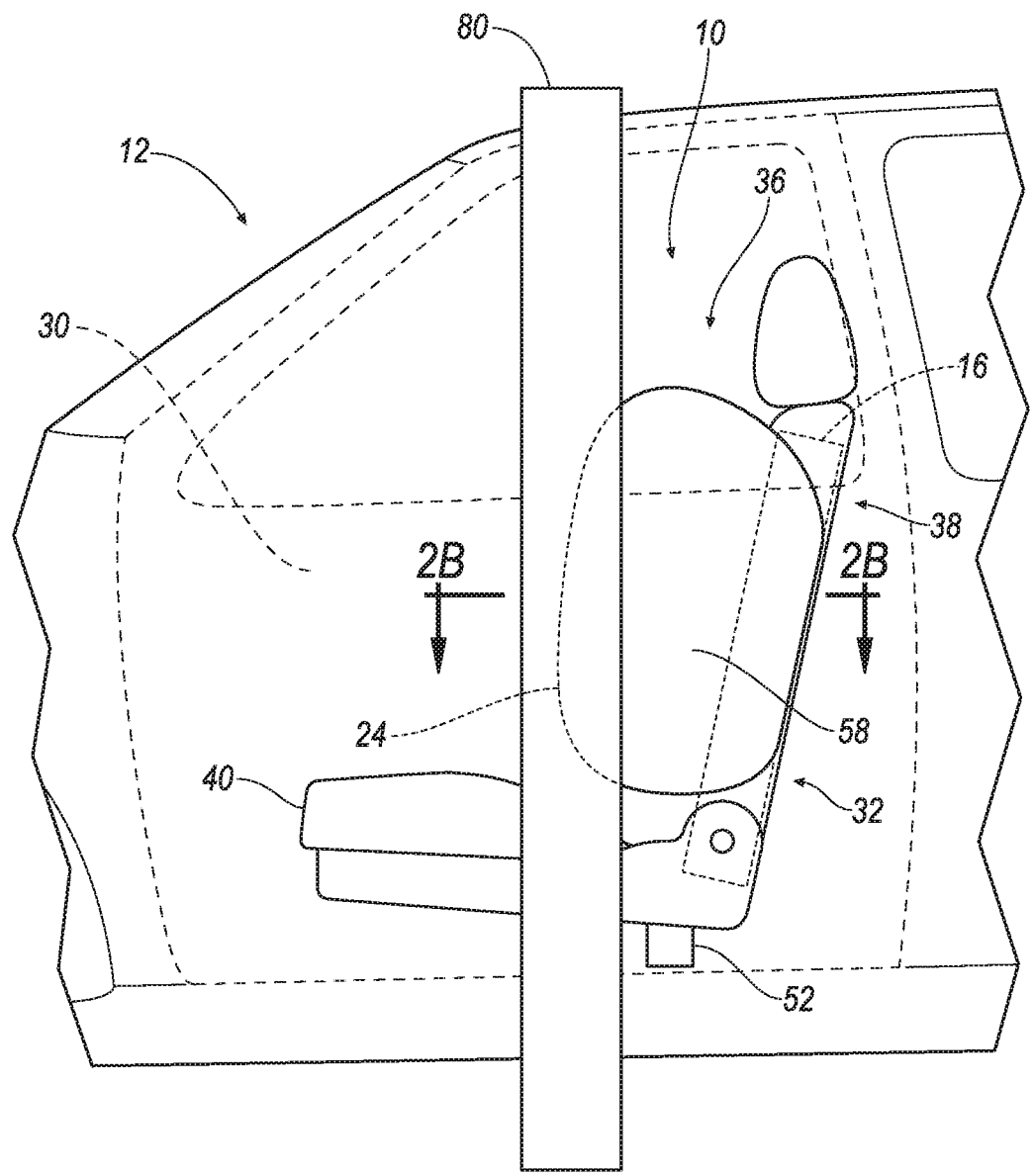
FIG. 2A is a side view of the vehicle with the seat assembly in a vehicle-forward position during a pole test.
Figure 2B:
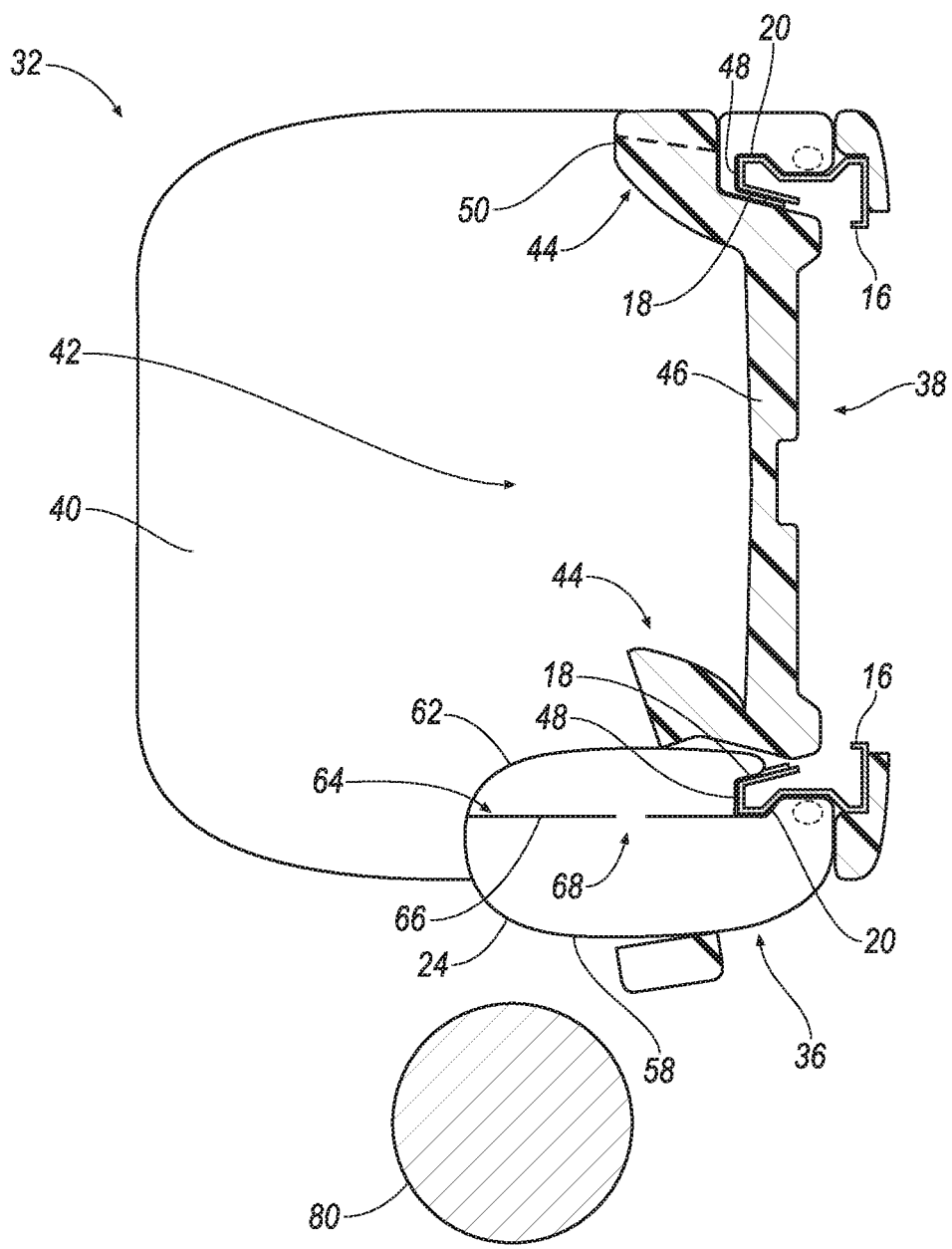
FIG. 2B is a cross-sectional view of the seat assembly through line 2B in FIG. 2A assembly and the pole of the pole test.
Figure 3A:
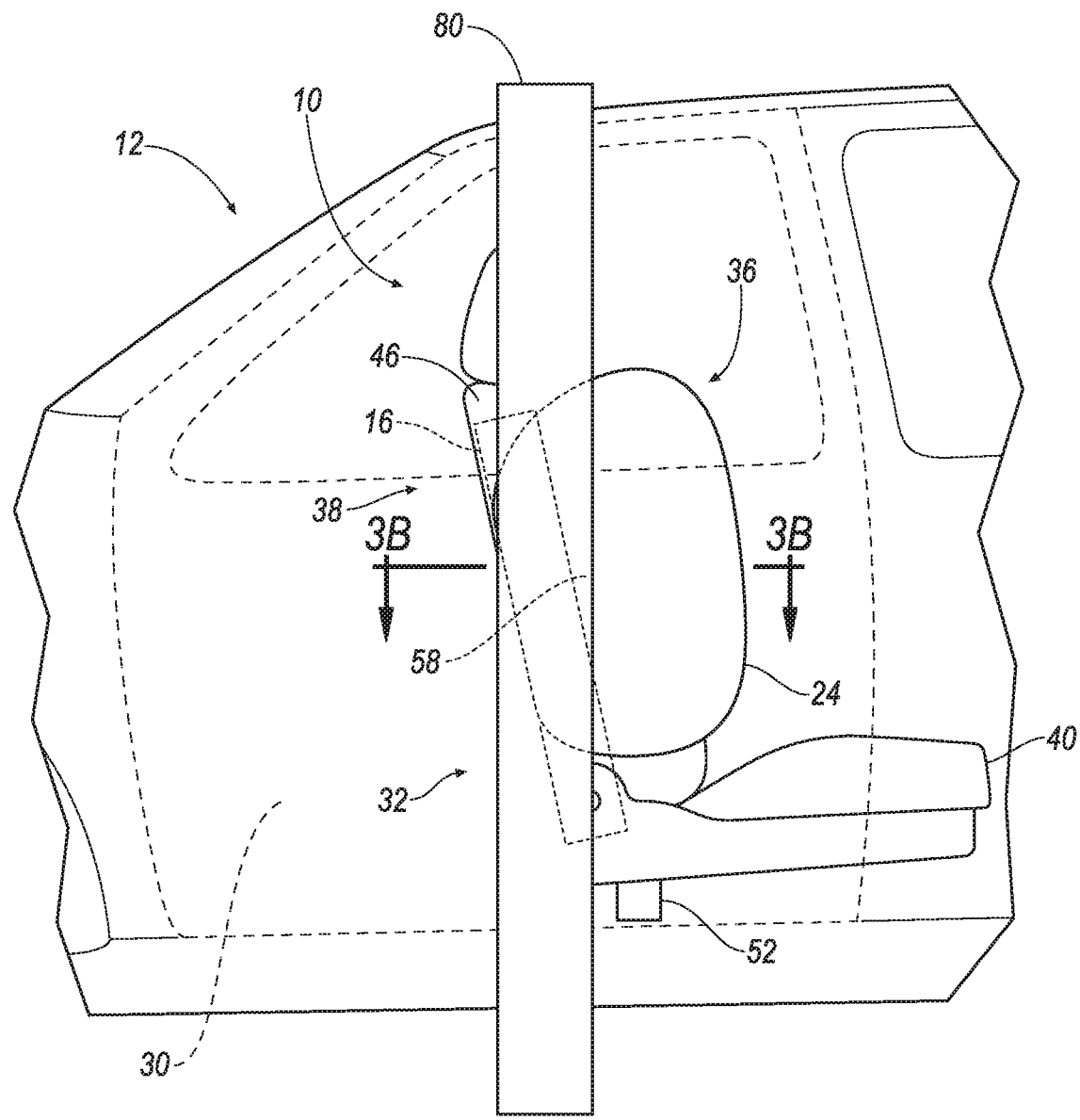
FIG. 3A is a side view of the vehicle with the seat assembly in a vehicle-rearward position during a pole test.
Figure 3B:
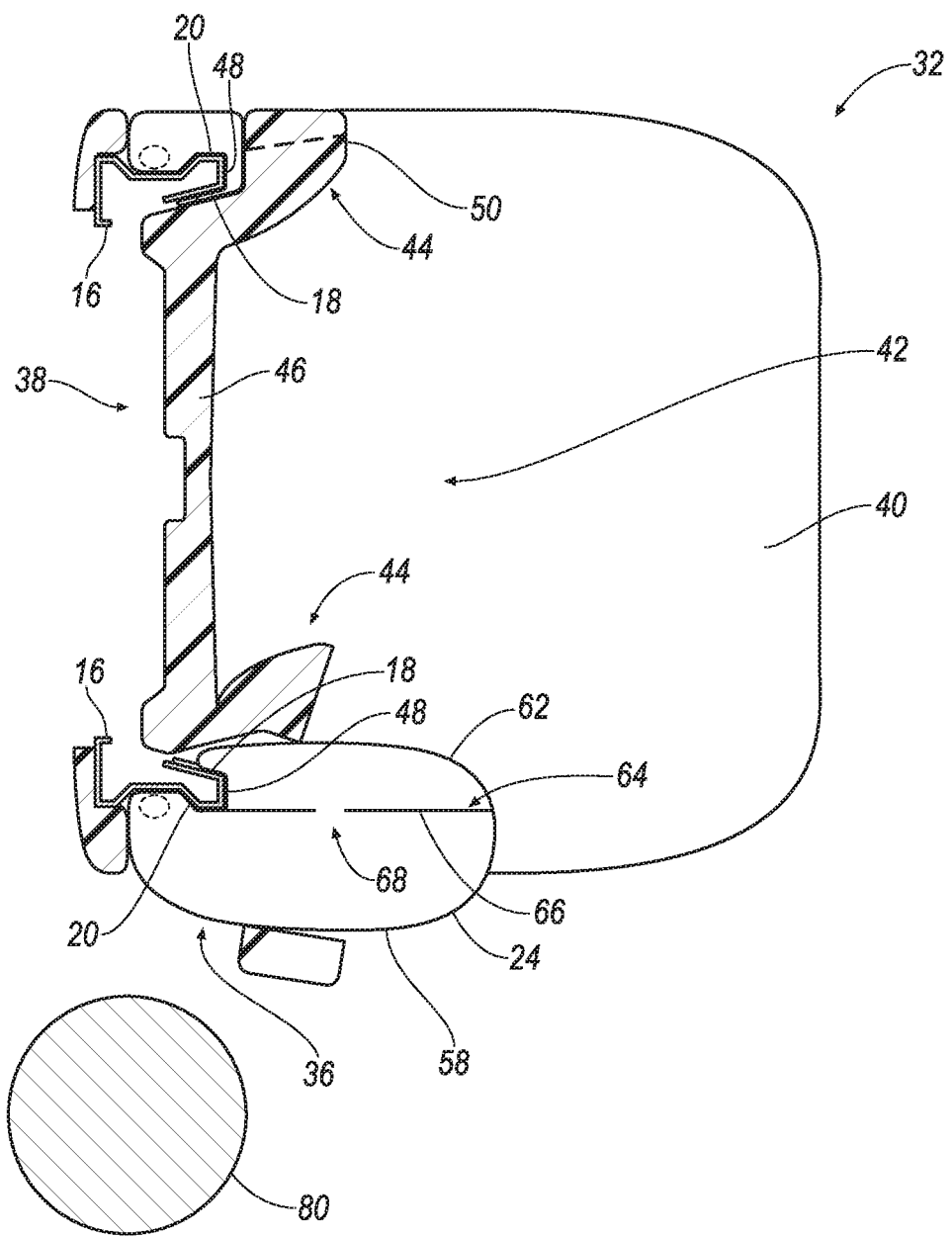
FIG. 3B is a cross-sectional view of the seat assembly through line 3B in FIG. 3A and the pole of the pole test.
Figure 4:
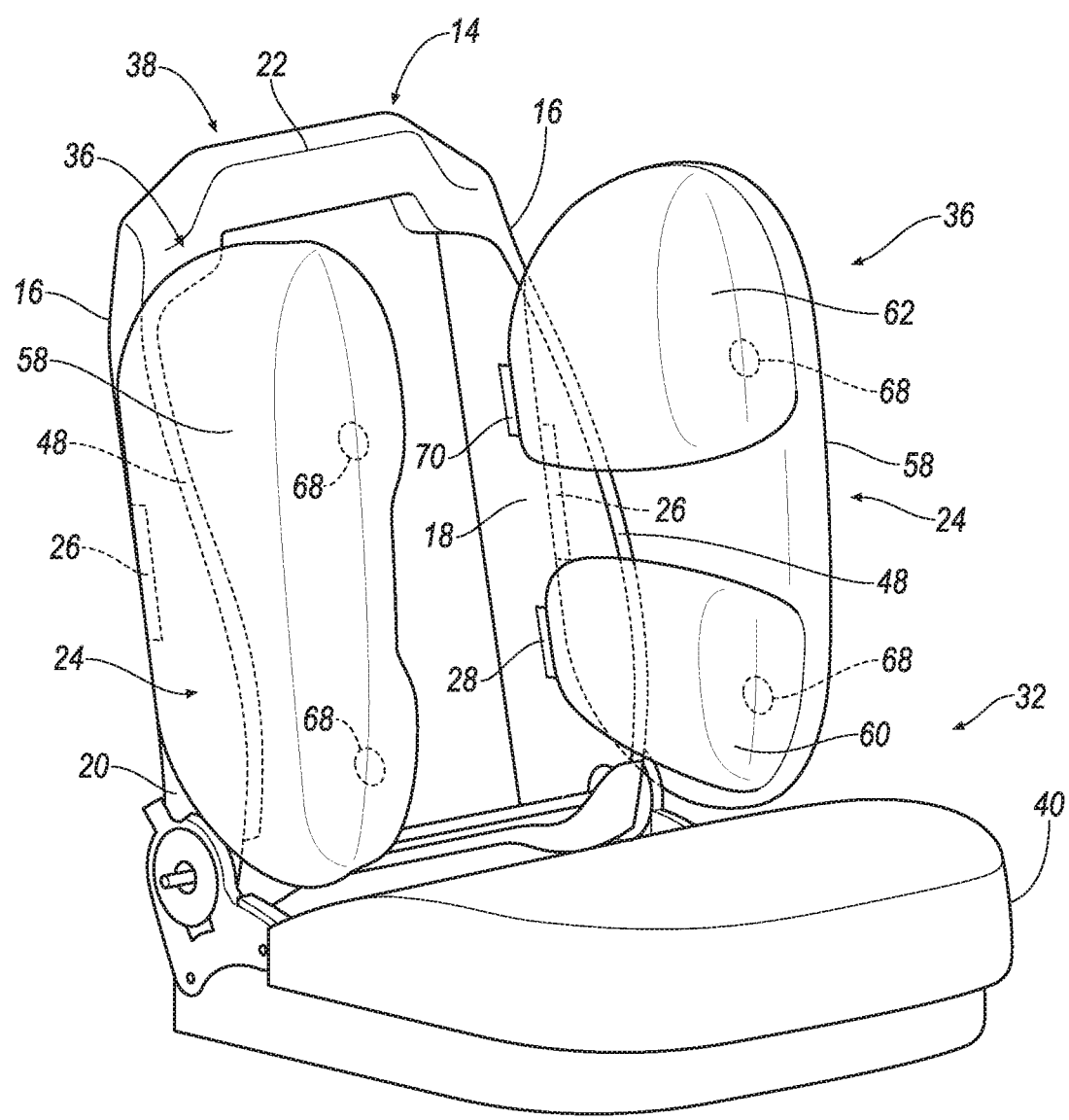
FIG. 4 is a perspective view of the seat assembly with two airbag assemblies in the inflated position.
Figure 5A:
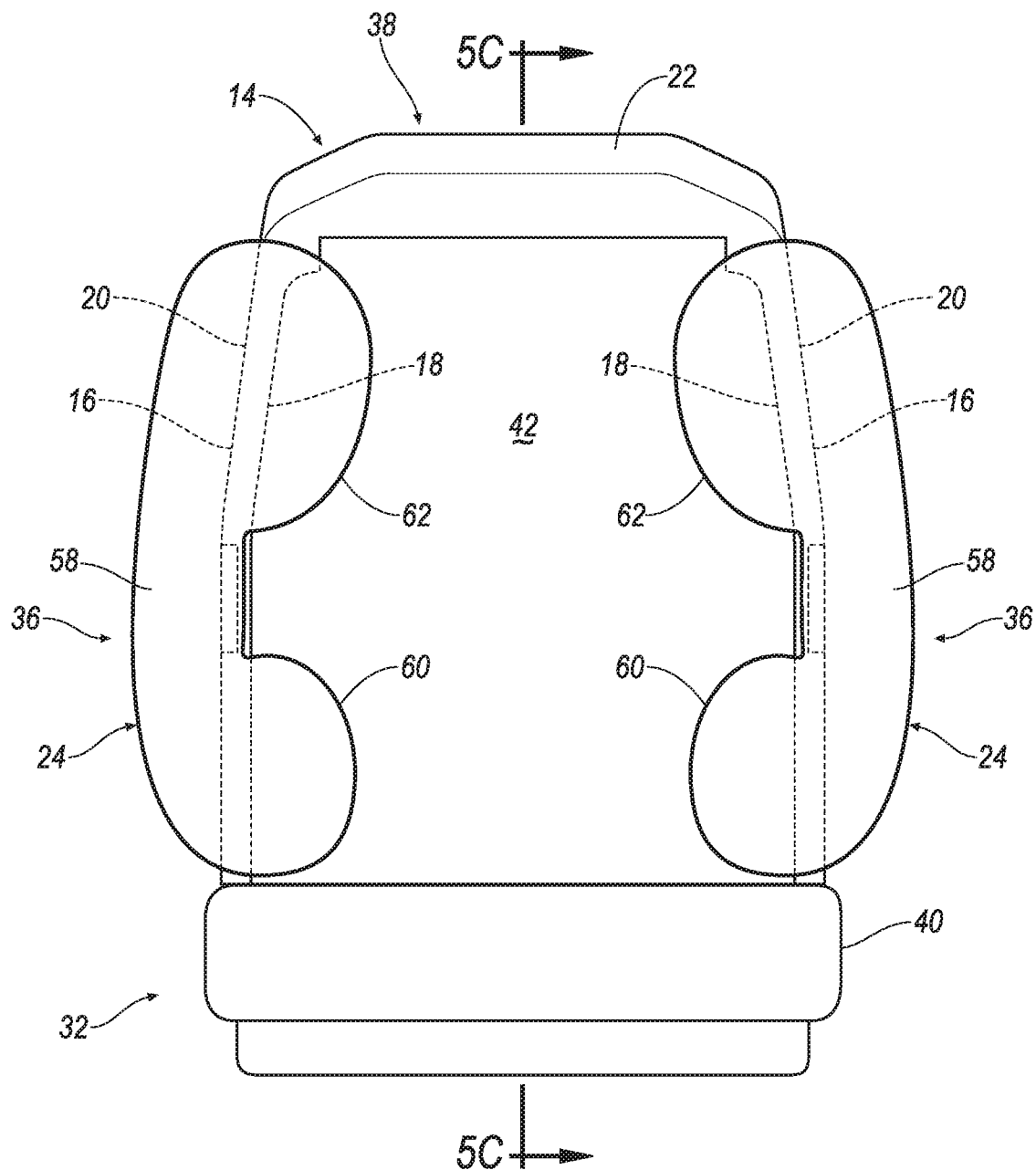
FIG. 5A is a front view of the seat assembly with two airbag assemblies in the inflated position.
Figure 5B:
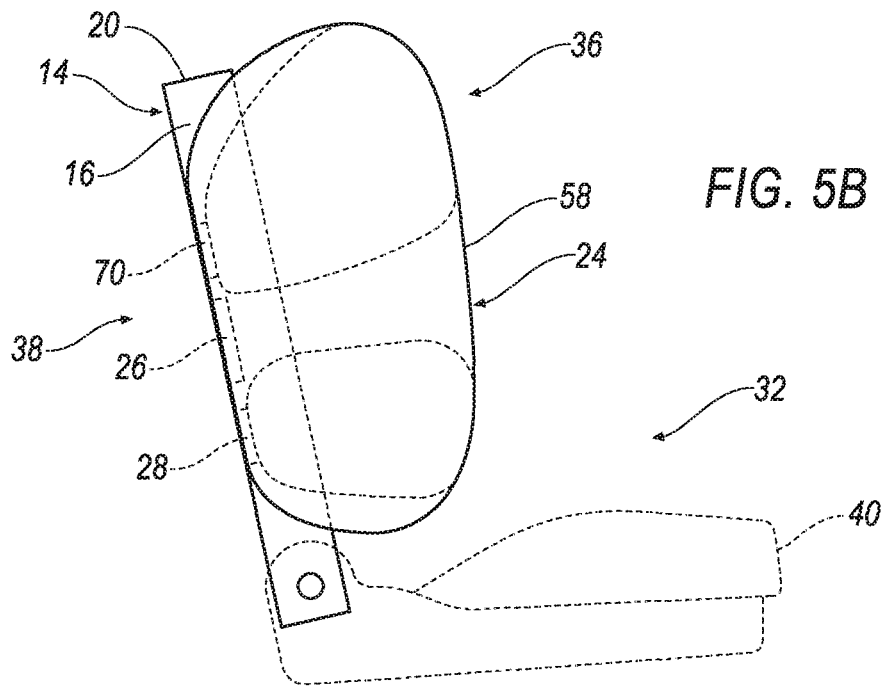
FIG. 5B is a side view of the seat assembly of FIG. 5A.
Figure 5C:
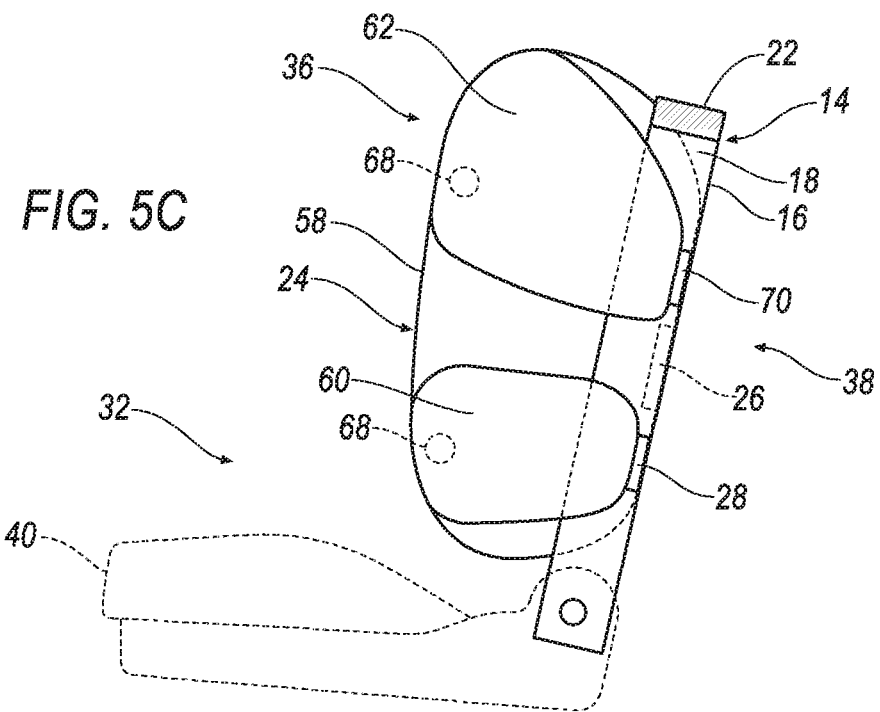
FIG. 5C is a cross-sectional view through line 5C in FIG. 5A.

As set forth above, each of the upright frame members 16 have the inward side 18 and the outward side 20 (see FIGS. 2B and 3B). The inward side 18 and the outward side 20 of the upright frame member 16 may be spaced from each other. As an example, upright frame member 16 may have a forward side 48 extending from the outward side 20 to the inward side 18. The forward side 48 faces in a seat-forward direction. As described further below, the airbag 24 inflates across at least a portion of the inward side 18 and the outward side 20 and inflates across at least a portion of the forward side 48 in examples including the forward side 48.

The inward sides 18 are spaced from each other and face each other. The outward sides 20 face away from each other. The outward side 20 of the upright frame member 16, regardless of the position of the seat 34, faces away from the occupant seating area 42. The inward side 18 of the upright frame member 16, regardless of the position of the seat 34, faces the inward side 18 of the other upright frame member 16.

The cross-member 22 extends from the inward side 18 of the one of the upright frame members 16 to the inward side 18 of the other upright frame member 16. The cross-member 22 is elongated generally horizontally. The seatback frame 14 may include any suitable number of cross-members 22. In the example shown in the Figures, the seatback frame 14 has a single cross-member 22. In an example with multiple cross-members 22, the cross-members 22 are vertically spaced from each other.

The covering 46 may include upholstery and padding. The upholstery may be cloth, leather, faux leather, or any other suitable material. The upholstery may be stitched in panels around the frame. The padding may be between the covering 46 and the seatback frame 14 and may be foam or any other suitable material.

The seatback 38, e.g., the covering 46, may have a tear seam 50 (shown in FIGS. 2B and 3B). The tear seams 50 are designed to rupture when the airbag 24 is inflated, i.e., the airbag 24 opens the tear seam 50 during inflation, as shown in FIGS. 2B and 3B. The tear seam 50 may be adjacent to the airbag 24, i.e., with nothing between the airbag 24 and the tear seam 50 during inflation of the airbag 24 such that the airbag 24 ruptures the tear seam 50. The tear seam 50 may be on the bolster 44, as shown in FIGS. 2B and 3B. In the example shown in the Figures, the covering 46 includes two tear seams 50, specifically, one tear seam 50 for seat 34 airbag 24. The tear seam 50 may be, for example, a line of perforations through the covering 46, a line of thinner covering 46 material than the rest of the covering 46, etc.

The seat bottom 40 may include a rotatable support 52. The rotatable support 52 provides the rotatability of the seat assembly 32 described above. For example, the rotatable support 52 is rotatable between the vehicle-forward position and the vehicle-rearward position. The rotatable support 52 supports the seat bottom 40 on the floor and allows the seat assembly 32 to rotate relative to the floor, e.g., between the vehicle-forward position and the vehicle-rearward position. The rotatable support 52 may include, for example, a pedestal, one or more toothed rings, etc. Adjustment of the rotatable support 52 may be manual, e.g., with a spring-loaded lever, or may be automated, e.g., with a motor and input buttons.

As set forth above, the seat assembly 32 includes at least one airbag assembly 36. The airbag assembly 36 includes the airbag 24 and an inflator 54. The airbag assembly 36 is mounted to the seatback 38, e.g., to the seatback frame 14. For example, the airbag assembly 36 may be mounted to one of the upright frame members 16. In examples shown in the Figures, one airbag assembly 36 is mounted to one of the upright frame members 16 and the other of the upright frame members 16 is mounted to the other of the upright frame members 16.

The airbag assembly 36 may include a housing that supports the airbag 24 on the seatback frame 14. In such examples, the housing is mounted to the seatback 38, e.g., to the upright frame member 16 of the seatback frame 14. For example, the housing may include locating elements, fasteners, etc., that engage the seatback 38 and/or fasteners may engage the housing and the seatback 38 to mount the housing to the seatback 38.

The housing may have two shells and a hinge between the shells. When closed, the shells define a cavity that houses the airbag 24. One of the shells may have engaging features that engage the other of the shells, e.g., spring-fingers on one of the shells that engage holes in the other of the shells, as shown in FIG. 3. As an example, one of the shells may be an inward shell and other of the shells may be an outward shell (with "inward" and "outward" referring to the relative position of the shells in a cross-seat direction). The shells may be closed when the airbag 24 is uninflated and the airbag 24 may be totally or partially enclosed by the shells in this position. The shells may split apart to allow the airbag 24 to inflate to the inflated position. The housing may have a generally rectangular-cuboid shape including, i.e., having three pairs of generally planar, parallel faces connected at twelve corners.

The airbag 24 has at least one connection 26 on the outward side 20 of the upright frame member 16 and at least one connection 28, 70 on the inward side 18 of the upright frame member 16, as discussed further below. Accordingly, the airbag 24 wraps around at least a portion of the upright frame member 16. Specifically, in examples including the forward side 48, such as shown in the Figures, the airbag 24 wraps around the forward side 48 from the outward side 20 to the inward side 18. As shown in FIGS. 2B and 3B, the airbag 24 wraps around the forward side 48 when the airbag 24 is uninflated (i.e., the top airbag 24 on the drawing of FIGS. 2B and 3B) and when the airbag 24 is in the inflated position (i.e., the bottom airbag 24 on the drawings of FIGS. 2B and 3B).

The airbag 24 may have at least one chamber on the inward side 18 of the upright frame member 16 and at least one chamber on the outward side 20 of the upright frame member 16. For example, the airbag 24 may include a first chamber 58 on the outward side 20 of the upright frame member 16 and a second chamber 60 on the inward side 18 of the upright frame member 16. The airbag 24 may include a third chamber 62 on the inward side 18 of the upright frame member 16. The second chamber 60 and the third chamber 62 may be spaced from each other along the upright frame member 16, i.e., spaced vertically.

The second chamber 60 and the third chamber 62 may be shaped and sized differently than the first chamber 58. For example, the first chamber 58 may be elongated along the upright frame member 16 and may extend from the upright frame member 16 in the seat-forward direction. The second chamber 60 and the third chamber 62 may be elongated horizontally. Specifically, the second chamber 60 and the third chamber 62 may be elongated from the first chamber 58 toward the inward side 18 of the upright frame member 16, e.g., from the first chamber 58 to the inward side 18. The second chamber 60 and the third chamber 62 may be tubular. The first chamber 58, the second chamber 60, and/or the third chamber 62 may extend across the forward face of the upright frame member 16. In the example shown in the Figures, the second chamber 60 and the third chamber 62 extend across the forward face of the upright frame member 16.

The second chamber 60 and the third chamber 62 are fluidly connected to the first chamber 58. In other words, inflation medium may flow between the first chamber 58 and the second chamber 60 and between the first chamber 58 and the third chamber 62. For example, the inflator 54 may inflate the first chamber 58 and inflation medium may flow from the first chamber 58 to the second chamber 60 and the third chamber 62.

The airbag 24 may include a baffle 64 between the first chamber 58 and the second chamber 60 and another baffle 64 between the first chamber 58 and the third chamber 62. The baffle 64 may include a fabric panel 66 and a vent 68 therethrough to reduce the flowrate from the first chamber 58 to the second chamber 60 and from the first chamber 58 to the third chamber 62. The vent 68 may be any suitable type of vent, e.g., an active vent, a passive vent, a one-way vent, etc. As another example, the second chamber 60 and the third chamber 62 may be open to the first chamber 58.

The airbag 24 includes connections 26, 28, 70 fixed to the upright frame member 16. Specifically, for the airbag 24 shown in the Figures, the first chamber 58 includes the first connection 26 connecting the first chamber 58 to the outward side 20, the second connection 28 connecting the second chamber 60 to the inward side 18, and a third connection 70 connecting the third chamber 62 to the inward side 18. The connection may be fixed to the airbag 24 and to the upright frame member 16 in any suitable fashion, e.g., fasteners, stitching, adhesive, etc.

One or more of the connections may be a tether. The tether may include one end fixed to the upright frame member 16 and another end fixed to the airbag 24 such that the airbag 24 is spaced from the upright frame member 16 by the tether. The tether may be, for example, the same type of material as the airbag 24.

The second chamber 60 may be positioned along the upright frame member 16 to be adjacent the pelvis of an occupant seated on the seat bottom 40 and the third chamber 62 may be positioned along the upright frame member 16 to be adjacent the thorax of the occupant seated on the seat bottom 40. In other words, the second chamber 60 may be a pelvic chamber and the third chamber 62 may be a thoracic chamber.

In the example shown in the Figures, one of the airbag assembly 36 is between the occupant seating area 42 and the door 30 when the seat assembly 32 is in the vehicle-forward position and the other of the airbag assembly 36 is between the occupant seating area 42 and the door 30 when the seat assembly 32 is in the vehicle-rearward position. When the airbag assembly 36 is between the occupant seating area 42 and the door 30, the upright frame member 16 is between the airbag 24 and the door 30 when the airbag 24 is in the inflated position. Specifically, in such a position, the upright frame member 16 is between the second chamber 60 and the third chamber 62. Accordingly, the second chamber 60 and the third chamber 62 control the kinematics, e.g., cushion, the occupant relative to the upright frame member 16. For example, the second chamber 60 and the third chamber 62 control the kinematics of the occupant in a side impact in which the door 30 intrudes toward the seat assembly 32. In such an event, if the door 30 impacts the seatback frame 14, the second chamber 60 and the third chamber 62 are positioned between the occupant seating area 42 and the seatback frame 14 to control the kinematics the occupant.

One example of a side impact described above is a pole test. The pole 80 of a pole test is shown in FIGS. 2A-3B. One example of a pole test is the side impact rigid pole test described in Federal Motor Vehicle Safety Standard 214, in which a rigid vertical pole 10 inches in diameter is delivered to the side of a test vehicle at 20 miles per hour The airbag assembly 36 is positioned to control the kinematics of the occupant during a side impact when the seat assembly 32 is in the vehicle-forward position (FIGS. 2A-2B) and when the seat assembly 32 is in the vehicle-rearward position (FIGS. 3A-3B) depending on the direction of the side impact. As an example, a pole impact test when the seat 34 is in the forward-facing position is shown in FIGS. 2A-2B. In such an example, the first chamber 58 of one of the airbags 24 is between the door 30 and pole and the occupant seating area 42 to control the kinematics of the occupant. The same pole impact test is shown in FIGS. 3A-3B with the seat 34 is in the vehicle-rearward position. In such an example, the second chamber 60 and the third chamber 62 of the other airbag assembly 36 are between the occupant seating area 42 and the upright frame member 16, door 30, and pole.

The airbag 24 may be of any suitable type of material, e.g., from a woven polymer. For example, the airbag 24 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating such as silicone, neoprene, urethane, polyorganosiloxane, etc. The first chamber 58, the second chamber 60 and the third chamber 62 may be a single piece of fabric, e.g., one-piece woven. As another example, the first chamber 58, the second chamber 60, and the third chamber 62 may be separately formed and subsequently attached, e.g., by stitching.

The inflator 54 may be, for example, a pyrotechnic inflator 54 that uses a chemical reaction to drive the inflation medium into the airbag 24. Alternatively, the inflator 54 may be, for example, a cold-gas inflator 54 that, when activated, ignites a pyrotechnic charge. Alternatively, the inflator 54 may be of any suitable type, for example, a hybrid inflator 54.

Figure 6:
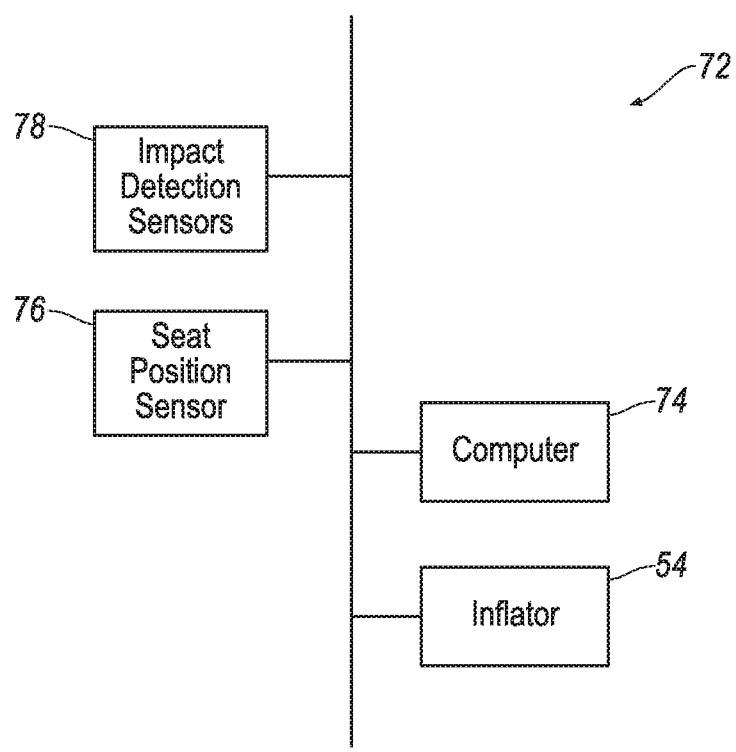
FIG. 6 is a block-diagram of a control system of the vehicle.

With reference to FIG. 6, a control system 72 of the vehicle 12 is schematically shown. The control system 72 includes a computer 74 having a processor and memory storing instructions executable by the processor. The computer 74 may be a microprocessor-based computing device implemented via circuits, chips, or other electronic components. For example, the computer 74 may include a processor, memory, etc. The memory may store instructions executable by the processor and the processor may read the instructions from the memory and execute the instructions.

The vehicle 12 may include seat position sensors 76 programmed to detect the position of the seat 34. The vehicle 12 may include any suitable number of seat position sensors 76, e.g., one seat 34 position sensor for each seat 34. The seat 34 position sensor may be mounted to any suitable component of the vehicle 12, e.g., the seat 34, the floor, etc. The processor may receive one or more signals from the seat position sensors 76 indicating the position of the seat 34, e.g., the vehicle-rearward position, the vehicle-forward position, etc.

The vehicle 12 may include impact detection sensors 78 programmed to detect the impact to the vehicle 12. The impact detection sensors 78 may be disposed in the vehicle 12. The impact detection sensors 78 may be of various types, e.g., pressure sensor, acceleration sensor, vision sensor, etc. When the vehicle impact occurs, the processor may receive one or more signals from the impact detection sensors 78 indicating the vehicle impact.

In order to receive the signals from the sensors, e.g., the impact detection sensors 78 and the seat position sensors 76, and to initiate the inflation of the airbags 24, the processor communicates with the sensors, e.g., the impact detection sensors 78 and the seat 34 position sensor, and the inflator 54, e.g., through a direct electrical wiring, through which an analog or a digital signal is transmitted, or through a communication network like CAN (Control Area Network), Ethernet, LIN (Local Interconnect Network) or any other way.

As set forth above, the memory stores instructions executable by the processor. Specifically, in examples including more than one airbag assembly 36, the memory stores instructions to selectively inflate one of the airbags 24 in response to a detection of a position of the seat 34 and detection of a sensed vehicle impact, e.g., a side impact. Specifically, the instructions include instructions to inflate the outboard airbag 24 on the side of the side impact. For example, in FIGS. 2A-2B, one of the airbags 24 is outboard (relative to the vehicle 12), which is detected based on detection of the position of the seat assembly 32. The instructions include instructions to inflate that airbag 24 in response to an impact at that side of the body. Said differently, the instructions include instructions to inflate that airbag 24 in response to detection that the seat assembly 32 is in the vehicle-forward position and detection of impact on that side of the body. In FIGS. 3A-3B, the other of the airbags 24 is outboard and the instructions include instructions to inflate the airbag 24 in response to an impact at that side of the body. Said differently, the instructions include instructions to inflate that airbag 24 in response to detection that the seat assembly 32 is in the vehicle-rearward position and detection of impact on that side of the body.

Computing devices, such as the computer 74, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer 74 (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer 74. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer 74 can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The adjectives "first," "second," and "third" are used herein merely as identifiers and do not indicate order or importance. Use of "in response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a seatback frame having a pair of upright frame members;
each of the upright frame members having an inward side and an outward side, the inward sides spaced from each other and facing each other, and the outward sides facing away from each other;
a cross-member extending from one of the upright frame members to the other of the upright frame members; and
an airbag having a first connection fixed to the outward side, a second connection fixed to the inward side of one of the upright frame members, and a third connection fixed to the inward side of the one of the upright frame members;
the airbag having a first chamber connected to the first connection, a second chamber extending from the first chamber to the second connection, and a third chamber extending from the first chamber to the third connection.

2. The assembly of claim 1, wherein the second connection is a tether extending from the second chamber to the inward side of the one of the upright frame members and the third connection is another tether extending from the third chamber to the inward side of the one of the upright frame members.

3. The assembly of claim 1, wherein the first chamber is elongated along the one of the upright frame members.

4. The assembly of claim 3, wherein the second chamber and the third chamber are elongated from the first chamber toward the inward side of the one of the upright frame members.

5. The assembly of claim 4, wherein the second chamber and the third chamber are fluidly connected to the first chamber.

6. The assembly of claim 1, further comprising a baffle between the first chamber and the second chamber and another baffle between the first chamber and the third chamber.

7. The assembly of claim 1, wherein the second chamber and the third chamber are vertically spaced from each another.

8. The assembly of claim 7, wherein the second chamber and the third chamber are elongated from the first chamber toward the inward side of the one of the upright frame members.

9. The assembly of claim 1, wherein the first chamber is elongated along the one of the upright frame members and the second chamber is elongated from the first chamber toward the inward side of the one of the upright frame members.

10. The assembly of claim 1, further comprising a covering, the airbag being between the covering and the seatback frame.

11. The assembly of claim 1, wherein the cross-member extends from the inward side of the one of the upright frame members to the inward side of the other upright frame member.

12. The assembly of claim 1, further comprising a seat bottom supporting the seatback frame, the seat bottom including a rotatable support rotatable between a vehicle-forward position and a vehicle-rearward position.

13. The assembly of claim 12, further comprising a door, the upright frame member being between the airbag and the door when the airbag is inflated and the seat bottom is in the vehicle-rearward position.

14. The assembly of claim 1, further comprising a computer having a processor and memory storing instructions executable by the processor to inflate the airbag in response to at least a detection that the seatback frame is in a vehicle-rearward position and detection of a sensed vehicle impact.

15. The assembly of claim 14, further comprising a door, the upright frame member being between the airbag and the door when the airbag is inflated and the seatback frame is in the vehicle-rearward position.

16. The assembly of claim 1, further comprising a second airbag fixed to the other upright frame member.

17. The assembly of claim 16, wherein the other upright frame member includes an outward side and an inward side, and the second airbag has a first connection fixed to the outward side of the other upright frame member and a second connection fixed to the inward side of the other upright frame member.

\* \* \* \* \*